(12) United States Patent
Luo et al.

(10) Patent No.: US 11,086,061 B2
(45) Date of Patent: Aug. 10, 2021

(54) DISPLAY MODULE AND MANUFACTURING METHOD OF THE SAME

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Kun Luo, Beijing (CN); Wenwei Mo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 46 days.

(21) Appl. No.: 16/406,608

(22) Filed: May 8, 2019

(65) Prior Publication Data
US 2020/0018881 A1    Jan. 16, 2020

(30) Foreign Application Priority Data

Jul. 16, 2018    (CN) .......................... 201810777374.2

(51) Int. Cl.
*G02B 5/30*    (2006.01)

(52) U.S. Cl.
CPC ......... *G02B 5/3083* (2013.01); *G02B 5/3025* (2013.01)

(58) Field of Classification Search
CPC ........................... G02B 5/3025; G02B 5/3083
USPC .................................................. 359/489.07
See application file for complete search history.

(56) References Cited

U.S. PATENT DOCUMENTS

| 8,284,330 | B2 * | 10/2012 | Lee | ...................... | G02B 5/0808 |
| | | | | | 348/842 |
| 9,557,588 | B2 | 1/2017 | Huitema et al. | | |
| 10,545,596 | B2 * | 1/2020 | Tsai | ...................... | H01L 27/323 |
| 2006/0238685 | A1 * | 10/2006 | Shibasaki | ........... | G02F 1/13363 |
| | | | | | 349/119 |

(Continued)

FOREIGN PATENT DOCUMENTS

| CN | 101681038 A | 3/2010 |
| CN | 104599598 A | 5/2015 |

(Continued)

OTHER PUBLICATIONS

Office action dated Feb. 27, 2020 for corresponding application 201810777374.2 with English translation attached.

*Primary Examiner* — Ricky D Shafer
(74) *Attorney, Agent, or Firm* — Nath, Goldberg & Meyer; Joshua B. Goldberg

(57) ABSTRACT

A display module and the manufacturing method of the same, which are able to eliminate the attachment mark between the supporting assembly and the display panel, are provided. The display module includes a display panel; a supporting assembly, configured to support the display panel; an adhesive layer, configured to attach the supporting assembly to a non-display surface of the display panel; and an optical filter layer being on a side of the adhesive layer distal to the supporting assembly, and an orthographic projection of the optical filter layer on the supporting assembly covers an orthographic projection of the adhesive layer on the supporting assembly.

10 Claims, 3 Drawing Sheets

(56) References Cited

U.S. PATENT DOCUMENTS

| | | | | |
|---|---|---|---|---|
| 2006/0291242 A1* | 12/2006 | Ko | ................... | G02F 1/133608 |
| | | | | 362/607 |
| 2009/0231524 A1* | 9/2009 | Tanaka | .................. | G02F 1/1339 |
| | | | | 349/110 |
| 2010/0259829 A1* | 10/2010 | Kim | .................... | G02B 27/026 |
| | | | | 359/609 |
| 2011/0007398 A1* | 1/2011 | Lim | .................... | H05K 9/0054 |
| | | | | 359/614 |
| 2011/0050668 A1* | 3/2011 | Park | .................... | G09G 3/3426 |
| | | | | 345/211 |
| 2011/0242742 A1* | 10/2011 | Kim | .................... | G02B 5/0231 |
| | | | | 361/679.01 |
| 2014/0125912 A1* | 5/2014 | Sakurai | ............ | G02F 1/133528 |
| | | | | 349/58 |
| 2019/0156094 A1 | 5/2019 | Du et al. | | |
| 2020/0073493 A1* | 3/2020 | Chen | ...................... | G06F 3/044 |
| 2020/0251025 A1* | 8/2020 | Li | ...................... | H01L 51/5246 |

FOREIGN PATENT DOCUMENTS

| | | |
|---|---|---|
| CN | 204925549 U | 12/2015 |
| CN | 206210290 U | 5/2017 |
| CN | 206236380 U | 6/2017 |
| CN | 107250850 A | 10/2017 |
| CN | 206627724 U | 11/2017 |
| CN | 107818732 A | 3/2018 |
| CN | 207558304 U | 6/2018 |
| CN | 108269500 A | 7/2018 |
| KR | 1020150002252 A | 1/2015 |

* cited by examiner

DISPLAY MODULE AND MANUFACTURING METHOD OF THE SAME

CROSS-REFERENCE TO RELATED APPLICATIONS

This application claims the priority of the Chinese Patent Application No. 201810777374.2, filed on Jul. 16, 2018; the contents of which are herein incorporated by reference in their entirety.

TECHNICAL FIELD

The present disclosure relates to the technical field of display, and particularly relates to a display module and a manufacturing method of the same.

BACKGROUND

Since the flexible display screen has the characteristics of being easy to deform, non-rigid and the like, the back surface of the flexible display screen in the prior art is provided with a supporting component which is used for supporting the flexible display screen so as to enable the flexible display screen to be flat and unfolded.

SUMMARY

The embodiments of the present disclosure provide a display module comprising a display panel; a supporting assembly configured to support the display panel; an adhesive layer configured to attach the supporting assembly to a non-display surface of the display panel; and an optical filter layer being on a side of the adhesive layer distal to the supporting assembly, and an orthographic projection of the optical filter layer on the supporting assembly covers an orthographic projection of the adhesive layer on the supporting assembly.

In some embodiments, the orthographic projection of the optical filter layer on the supporting assembly completely overlaps the orthographic projection of the adhesive layer on the supporting assembly.

In some embodiments, the optical filter layer is on the non-display surface of the display panel.

In some embodiments, a transparent optical adhesive may be between the optical filter layer and the non-display surface of the display panel. The transparent optical adhesive attaches the optical filter layer to the non-display surface of the display panel.

In some embodiments, the adhesive layer and the transparent optical adhesive both include optical clear adhesive.

In some embodiments, the display module further includes a protective layer, wherein the protective layer is on a side of the display panel distal to the supporting assembly.

In some embodiments, the optical filter layer includes a quarter-wave plate (¼λ) and a polarizer, and the polarizer is on a side of the quarter-wave plate distal to the adhesive layer.

The present disclosure provides a display device including the display module.

The present disclosure provides a manufacturing method of the display module comprising attaching the supporting assembly to the non-display surface of the display panel; attaching the optical filter layer to the side of adhesive layer distal to the supporting assembly such that the orthographic projection of the optical filter layer on the supporting assembly covers the orthographic projection of the adhesive layer on the supporting assembly.

In some embodiments, attaching the optical filter layer to the side of the adhesive layer distal to the supporting assembly includes attaching the optical filter layer to the non-display surface of the display panel by transparent optical adhesive.

In some embodiments, attaching the optical filter layer to the side of the adhesive layer distal to the supporting assembly includes attaching the optical filter layer to the non-display surface of the display panel by roller attachment.

DETAILED DESCRIPTION

Hereinafter, the present disclosure is described in further details with reference to the accompanying drawings and the detailed description to make those skilled in the art better understand the aspects of the present disclosure.

It should be noted that the display module in the present disclosure is particularly applicable to a flexible display module; so as an example, the display module is a flexible display module in the embodiments of the present disclosure, and the display panel of the flexible display module is a flexible display panel. It should be apparent that the display module of the present disclosure is not limited to the flexible display module described above. In addition, the terms "comprise" or "include" and the like indicate that the components and the objects appear before those terms include the components and the objects or the equivalents thereof, and do not exclude other components or objects.

Figure 1:
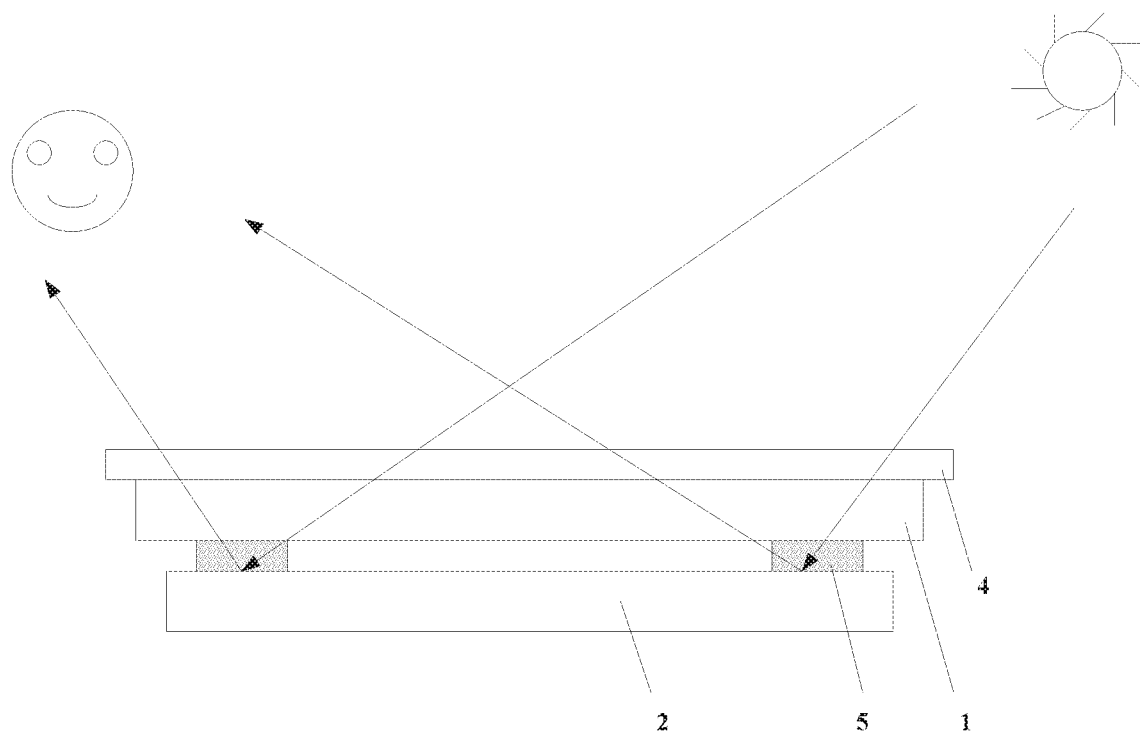
FIG. 1 is a schematic structural diagram of a flexible display module in the related art.

FIG. 1 is a schematic structural diagram of a flexible display module in the related art. As shown in FIG. 1, the flexible display module includes a flexible display panel 1, and a supporting assembly 2, and the supporting assembly 2 is directly attached to a non-display surface of the flexible display panel 1 by an adhesive layer 5. The attachment mark under the lighting environment is easy to be seen from the front of the flexible display panel to lower the user experience of using the flexible display module.

Figure 2:
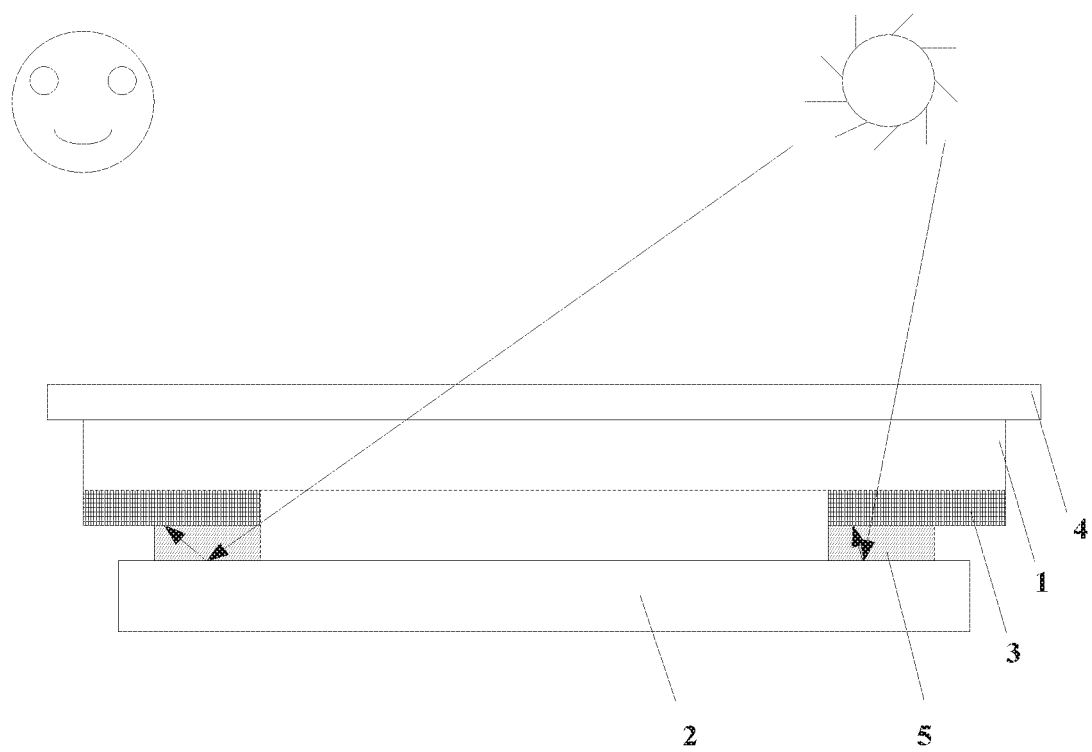
FIG. 2 is a schematic structural diagram of a flexible display module according to an embodiment of the present disclosure.

For the above problems; an embodiment of the present disclosure provides a flexible display module. As shown in FIG. 2, the flexible display module includes a flexible display panel 1, a supporting assembly 2, and an optical filter layer 3, the supporting assembly 2 is attached to the non-display surface of the flexible display panel 1 by the adhesive layer 5 for supporting the flexible display panel 1; and the optical filter layer 3 is on a side of the adhesive layer 5 distal to the supporting assembly 2 for filtering out the reflected light that occurs on the surface of supporting assembly 2 corresponding to the adhesive layer 5.

The flexible display module in this embodiment comprises an optical filter layer 3 which is on the side of the adhesive layer 5 distal to the supporting assembly 2, and the optical filter 3 is at each position where the adhesive layer 5 is provided, so that when environmental light irradiates on the surface of supporting assembly 2 and is reflected, the optical filter layer 3 can filter out the reflected light passing through the adhesive layer 5, and there is no outgoing light from the surface of the optical filter layer 3. In this case, the user of the flexible display panel 1 cannot see the adhesive layer 5, i.e., the user will not see the attachment mark between the supporting assembly 2 and the flexible display panel 1, and the user experience is improved.

In the present embodiment, the orthographic projection of the optical filter layer 3 on the supporting assembly 2 may cover, for example, the orthographic projection of the adhesive layer 5 on the supporting assembly 2, that is to say, the optical filter layer 3 may be on the entire non-display surface of the flexible display panel 1, or may be on a part of the non-display surface of the flexible display panel 1, as long as the optical filter layer 3 is at each position where the adhesive layer 5 is provided so that the optical filter layer 3 may filter out the reflected light passing through adhesive layer 5 when the environmental light irradiates on the surface of the supporting assembly 2, and the description is omitted here.

Further, in order to lower the influence of the interior light transmittance of the flexible display panel 1 by the optical filter layer 3 after arranging the optical filter layer 3 on the non-display surface of the flexible display panel 1, the orthographic projection of the optical filter layer 3 on the supporting assembly 2 completely overlaps the orthographic projection of the adhesive layer 5 on the supporting assembly 2.

In order to simplify the manufacturing process of the flexible display module in this embodiment, the optical filter layer 3 is, for example, on the non-display surface of the flexible display panel 1. It should be apparent that the optical filter layer 3 may also be disposed on other layer, as long as the position of the optical filter layer 3 corresponds to the position of the adhesive layer 5, so that the optical filter layer 3 can filter out the reflected light from the surface of the adhesive layer 5, and the present disclosure is not limited thereto.

Further, a transparent optical adhesive layer may be provided between the optical filter layer 3 and the non-display surface of the flexible display panel 1, in other words, the optical filter layer 3 of the present embodiment is attached to the non-display surface of the flexible display panel 1 through the transparent optical adhesive layer.

In the present embodiment, the adhesive layer 5 and the transparent optical adhesive layer may both be of, for example, Optical Clear Adhesive (OCA), and the OCA has characteristics of being colorless and transparent, high in transmittance and the like, which may lower the influence of the interior light transmittance of the flexible display panel 1 by the newly added layers, i.e., the transparent optical adhesive layer, the optical filter layer 3, and the adhesive layer 5. It should be apparent that the adhesive layer 5 and the transparent optical adhesive layer may further be of other transparent adhesive, and is not limited thereto.

Figure 3:
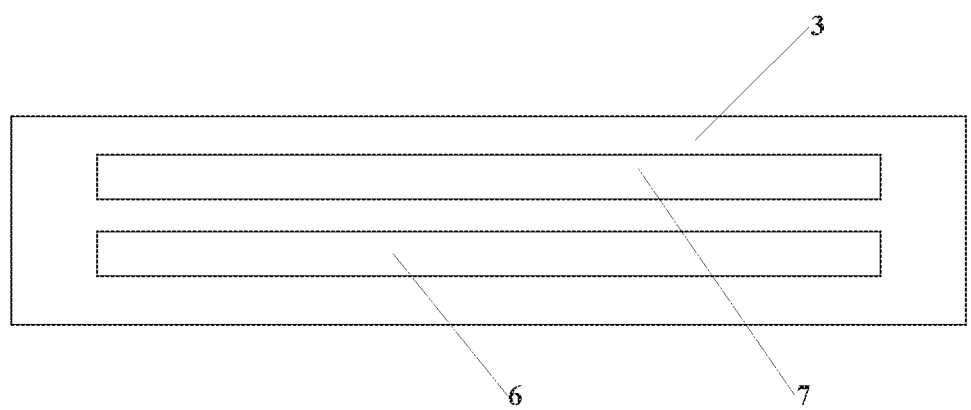
FIG. 3 is a schematic structural diagram of an optical filter layer according to an embodiment of the present disclosure.

In the present embodiment, as shown in FIG. 3, the optical filter layer 3 comprises, for example, a quarter-wave plate (¼λ) 6 and a polarizer 7. The polarizer 7 may be on a side of the quarter-wave plate 6 distal to the adhesive layer 5, and the polarizer 7 may include polyvinyl alcohol (PVA), cellulose triacetate (TAC), pressure sensitive adhesive (PSA film) and the like. It is apparent that the optical filter layer 3 is not limited thereto and will not be described here.

In the present embodiment, the flexible display module may further be provided with, for example, a protective layer 4 provided on a side of the flexible display panel 1 distal to the supporting assembly 2, to protect the flexible display panel 1 and improve the service life of the flexible display panel 1.

In summary, since an optical filter layer 3 is on the non-display surface of the flexible display panel 1, and the optical filter layer 3 is at a position corresponding to the position where the adhesive layer 5 is located, when environmental light irradiates on the surface of supporting assembly 2 and is reflected, the optical filter 3 can filter out reflected light passing through the adhesive layer 5, so that there is no outgoing light from the surface of the optical filter 3. In this case, the user of the flexible display panel 1 cannot see the adhesive layer 5, i.e., the user will not see the attachment mark between the supporting assembly 2 and the flexible display panel 1, and the user experience is improved.

Figure 4:
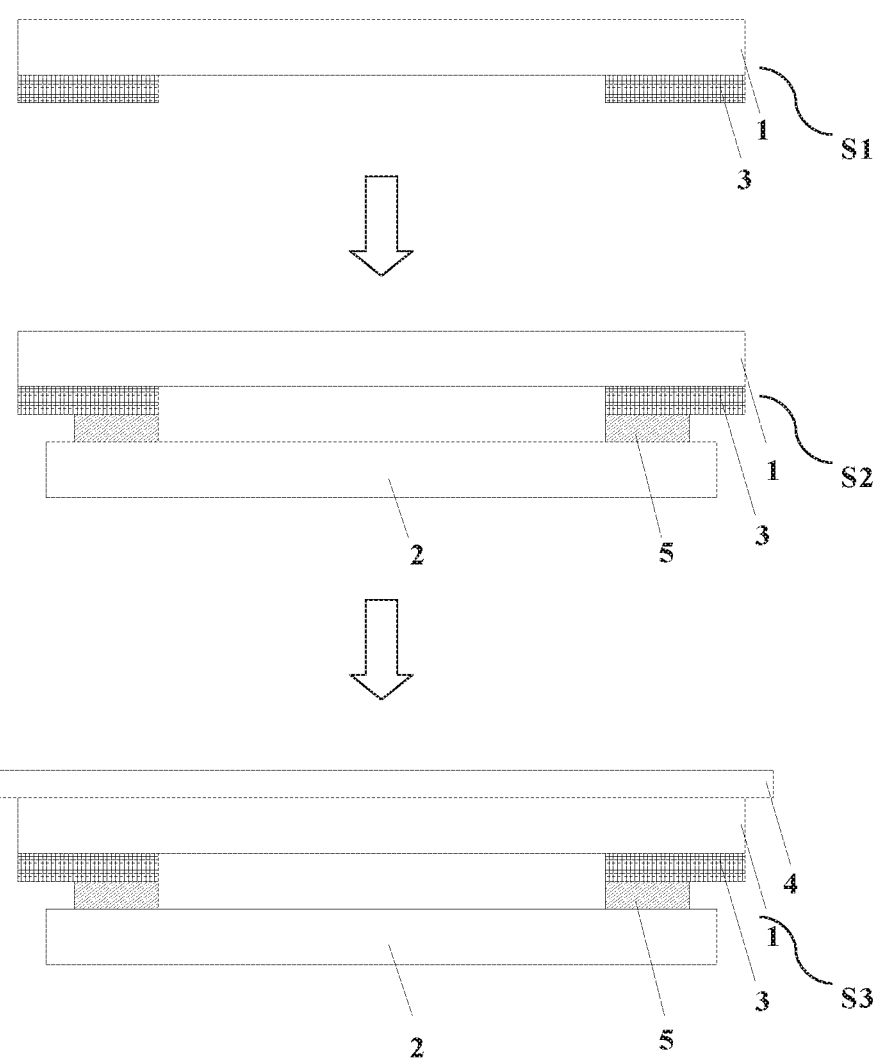
FIG. 4 is a process flow diagram illustrating a manufacturing method of a flexible display module according to an embodiment of the present disclosure.

FIG. 4 is a process flow diagram illustrating a manufacturing method of a flexible display module according to an embodiment of the present disclosure. As shown in FIG. 4, the manufacturing method of the flexible display module comprises steps S1 to S3.

In step S1, a optical filter layer 3 is attached to a non-display surface of the flexible display panel 1.

Specifically, the optical filter layer 3 is attached to the non-display surface of the flexible display panel 1 by the means of transparent optical adhesive or roller attachment. As shown in FIG. 4, in order to avoid the occurrence of lowering the interior light transmittance of the flexible display panel 1 after adding the transparent optical adhesive and the optical filter layer 3 on the non-display surface, generally the optical filter layer 3 may be attached to the non-display surface at the peripheral region.

In addition, it should be further noted that the optical filter layer 3 is attached to the non-display surface of the flexible display panel 1 on the purpose of simplifying the manufacturing process of the flexible display panel 1 in the present embodiment, that is, the optical filter layer 3 may be disposed on other layer, for example, it may be disposed on the display surface of the flexible display panel 1, as long as the optical filter layer 3 is arranged at a position corresponding to the position where the adhesive layer 5 is sequentially disposed on the non-display surface, and the reflected light from the surface of the adhesive layer 5 is filtered out, and is not limited herein.

In step S2, the supporting assembly 2 is attached to the non-display surface of the flexible display panel 1 subjected to the step S1 described above.

Specifically, first, an adhesive layer 5 is attached to the peripheral region of the supporting assembly 2 according to the specific position of the optical filter layer 3 attached to the non-display surface in the step S1 to ensure that the attached optical filter layer 3 in the step S1 is arranged at the position corresponding to the position where the adhesive layer 5 is arranged; then, the position of the adhesive layer 5 is aligned with the position of the optical filter layer 3, and the adhesive layer 5 is attached to the corresponding optical filter layer 3 thereto so as to attach the supporting assembly 2, to which the adhesive layer 5 is attached, to the non-display surface of the flexible display panel 1 subjected to the step S1 described above.

In step S3, a protective layer 4 is formed on a side of the flexible display panel 1 distal to the supporting assembly 2.

It should be noted that the step S3 may also be performed before the step S1, i.e., after forming the protective layer 4 on the display surface of the flexible display panel 1, the optical filter layer 3 and the supporting assembly 2 are attached sequentially to the non-display surface of the flexible display panel 1. In this case where the step S3 is performed before the step S1, if it is necessary to attach the optical filter layer 3 onto the display surface of the display panel 1, the optical filter layer 3 may be disposed between the display panel 1 and the protective layer 4, alternatively, the optical filter layer 3 may be disposed on a side of the protective layer 4 distal to the display panel.

It should be understood that the above embodiments are merely exemplary embodiments employed to illustrate the principles of the present disclosure, and the present disclosure is not limited thereto. Various modifications and improvements may be made to those skilled in the art without departing from the spirit and scope of the present disclosure, which are also considered to be within the scope of the present disclosure.

What is claimed is:

1. A display module, comprising:
    a display panel;
    a supporting assembly, configured to support the display panel;
    an adhesive layer, configured to attach the supporting assembly to a non-display surface of the display panel; and
    an optical filter layer being on a side of the adhesive layer distal to the supporting assembly, and an orthographic projection of the optical filter layer on the supporting assembly covers an orthographic projection of the adhesive layer on the supporting assembly,
    wherein the optical filter layer comprises a quarter-wave plate and a polarizer, and the polarizer is on a side of the quarter-wave plate distal to the adhesive layer.

2. The display module of claim 1, wherein the orthographic projection of the optical filter layer on the supporting assembly completely overlaps the orthographic projection of the adhesive layer on the supporting assembly.

3. The display module of claim 1, wherein the optical filter layer is on the non-display surface of the display panel.

4. The display module of claim 3, further comprising a transparent optical adhesive between the optical filter layer and the non-display surface of the display panel, wherein the transparent optical adhesive attaches the optical filter layer to the non-display surface of the display panel.

5. The display module of claim 4, wherein the adhesive layer and the transparent optical adhesive both include optical clear adhesive.

6. The display module of claim 1, further comprising a protective layer, wherein the protective layer is on a side of the display panel distal to the supporting assembly.

7. A display device, comprising the display module of claim 1.

8. A manufacturing method of the display module of claim 1, comprising:
    attaching the supporting assembly to the non-display surface of the display panel by the adhesive layer; and
    attaching the optical filter layer to the side of the adhesive layer distal to the supporting assembly such that the orthographic projection of the optical filter layer on the supporting assembly covers the orthographic projection of the adhesive layer on the supporting assembly.

9. The manufacturing method of the display module of claim 8, wherein attaching the optical filter layer to the side of the adhesive layer distal to the supporting assembly comprises attaching the optical filter layer to the non-display surface of the display panel by a transparent optical adhesive.

10. The manufacturing method of the display module of claim 8, wherein attaching the optical filter layer to the side of the adhesive layer distal to the supporting assembly comprises attaching the optical filter layer to the non-display surface of the display panel by roller attachment.

* * * * *